March 29, 1955     D. V. N. HARDY ET AL     2,705,186
MANUFACTURE OF ALUMINUM CHLORIDE
Filed July 17, 1950
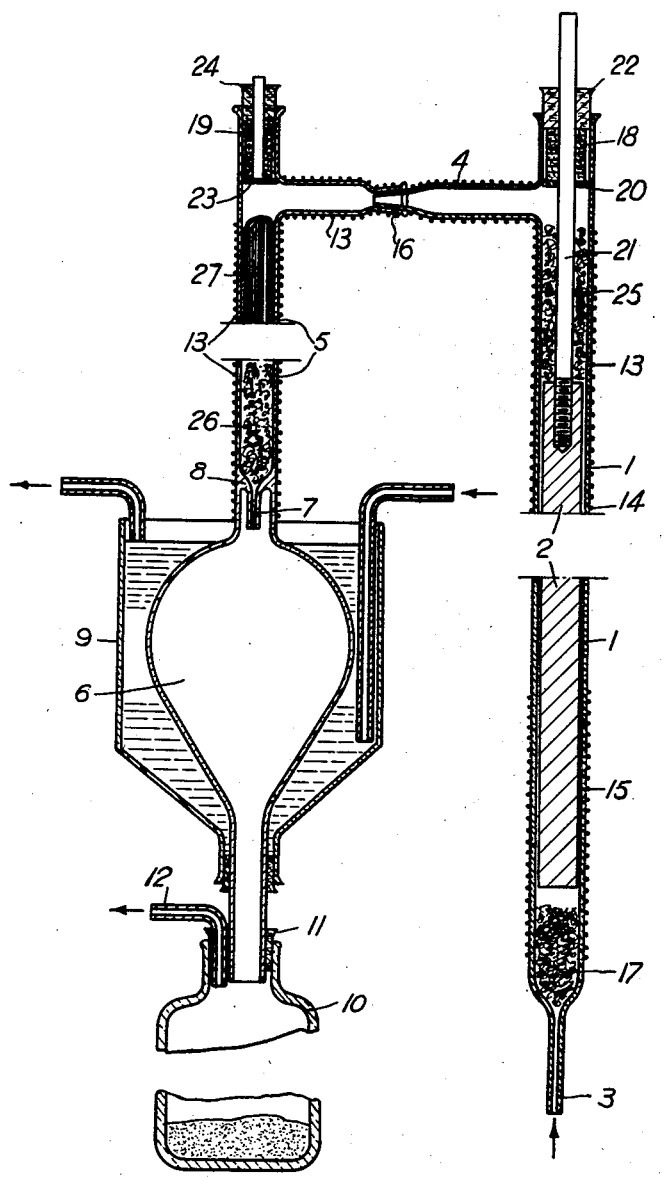
INVENTORS
Douglas Vernon Holman Hardy
& Donald Gregory Grant
BY G. E. O'Dell
ATTORNEY

United States Patent Office 2,705,186
Patented Mar. 29, 1955

2,705,186
MANUFACTURE OF ALUMINUM CHLORIDE

Douglas Vernon Nelmar Hardy, Hampton, and Donald Gregory Grant, Teddington, Middlesex, England, assignors, by mesne assignments, to The Imperial Trust for the Encouragement of Scientific and Industrial Research, London, England, a corporation of Great Britain Application July 17, 1950, Serial No. 174,266

4 Claims. (Cl. 23—93)

The object of our invention is to prepare anhydrous aluminium chloride as a free-flowing white powder especially adapted for use in technical and laboratory operations.

In accordance with our invention we sublime aluminium chloride by heat and allow the sublimed substance to be condensed in a cooled chamber in such a manner as to avoid solidification on the walls of the chamber. In further development of the invention we may combine the sublimation and condensation with the production of the chloride itself. In that case we arrange for the reaction between the aluminium which we use in massive form, and the chlorine to take place without melting any appreciable amount of the aluminum and we maintain the chloride as formed in a sublimed condition until it reaches the cooled chamber for condensation. It is essential for the efficient working of this development of our process that the aluminium should be as pure as possible, say 99.95 per cent, as the commercial metal contains appreciable amounts of other metals in particular iron as well as graphite which interfere with production.

In the practical operation of our process, the sublimed chloride is caused to pass through one or more nozzles in such a manner as to produce a vapour stream or streams of high velocity. The stream or streams of rapidly moving vapour are directed towards the centre of a capacious chamber whose walls are kept cool, for example, by immersion in cold water, and are so shaped as to enable the finely pulverulent aluminium chloride which forms in the chamber and settles to the bottom, to flow freely from an opening at the base of the chamber into a suitable receiver. The latter is protected against ingress of moisture, whether in liquid or in vapour form, and has a vent by which waste gases can be discharged. The receiver may also be fitted with a discharging device by which the aluminium chloride can be transferred by gravity flow into containers without exposure to atmospheric moisture. The downward flow of the powder may be assisted by any suitable device for imparting gentle vibration to the chamber and receiver. Alternatively the receiver may conveniently be a container in which the aluminium chloride is to be transported. In either case means are provided for rapidly attaching and removing containers, and for preventing ingress of moisture during the filling operation. When the process is combined with the production of the chloride, the aluminium is conveniently in the form of one or more massive rods, preferably mounted in a vertical direction, which serve not only to provide the necessary metal but also to conduct the intense heat of reaction away from the reaction zone, and by so doing, substantially to avoid any melting of the metal. These metal rods may be carried outside the apparatus and cooled by any convenient means, for example, by air or water, in order to assist the dissipation of heat. The chlorine may have access to the lower end of the rod, and the apparatus from the upper end of the rod or thereabouts is heated all the way to the nozzle or jets to keep the chloride in a sublimed condition. The sublimed chloride on its way to the nozzle may pass over heated aluminium of extended surface as foil or turnings to remove any free chlorine.

For the purpose of starting the reaction separate heating means is provided in the region of the lower end of the rod.

A convenient form of apparatus for practice of the invention on a small scale is diagrammatically shown in the accompanying drawing.

The apparatus shown comprises a vertical tube 1 in which the aluminium rod 2 is suspended with small clearance, having an admission connection 3 for gas at its lower end, and a horizontal branch 4 above the upper end of the rod, leading to a second vertical tube 5 terminating at its lower end in a bulb shaped chamber 6 and having a narrow nozzle 7 formed in a partition 8 a little above the junction. The chamber is immersed in a water jacket 9 and its lower end enters a bottle-like receiver 10 through a stopper 11 which also carries a gas outlet pipe 12. Heating is provided for by an electric resistance winding 13, e. g. a Nichrome wire, over the whole length of the apparatus from a level 14 a little below the upper end of the rod 2, to the junction with the chamber 6. A similar winding 15 over the lower part of the first vertical tube 1 provides for heating up the metal for starting the reaction. If joints are provided, for instance a joint 16 in the horizontal branch 4, to allow for taking apart, the windings are made in corresponding separate sections.

To catch any molten aluminium a porous refractory material 17 may be placed below the rod or rods, preferably, as shown, in such a manner as to cause the incoming chlorine to pass through the refractory material and to react rapidly with the molten metal thereon, thereby preventing an accumulation of molten metal. The porous refractory may consist of coarse unglazed firebrick, or of asbestos so shaped as to retain the molten metal and to prevent contact between the molten metal and the confining wall of the reaction vessel 1. Any unheated dead ends in the sublimation section should be filled with a refractory, non-reactive material such as asbestos, or glass wool in order to provent the formation of solid blocks of aluminium chloride therein. This applies particularly to the region where the aluminium rod or rods are brought out of the apparatus in order to aid the dissipation of heat. Thus as shown, the upper end of both tubes 1 and 5 above the horizontal branch 4 may be filled with asbestos discs 18, 19 respectively. The discs 18 are supported by a disc 20 on an aluminium rod 21 by which the rod 2 is suspended and which passes out of the apparatus through a cork or other stopper 22 to aid in the dissipation of heat, while the discs 19 are supported by a disc 23 on a short aluminium rod held by a cork or other stopper 24. There may also be a filling 25 of asbestos or glass wool in the tube 1 above the rod 2, and a similar filling 26 in the second vertical tube 5 above the nozzle 7 in order to prevent it from becoming blocked by particles of foreign matter which may be conveyed thereto by the vapour stream. The tube connecting the reaction and condensing chambers may be packed in part with pure aluminium in the form of millings, turnings, gauze or foil, in order to utilize any residual chlorine which, if not removed, may be retained by the aluminium chloride powder whereupon it loses its free-flowing property. Such aluminium in the form of a roll of foil 27 is shown in the upper part of tube 5.

As it is practically essential to exclude water, the whole apparatus is washed out with dry air or nitrogen before admitting chlorine and starting the reaction. If it is desired to slow down the reaction the chlorine may be diluted with dry nitrogen but usually this is unnecessary. After the reaction the chlorine is turned off and the apparatus again swept with nitrogen and allowed to cool. For small scale preparations where cleanliness and ease of construction are paramount considerations we prefer to construct the apparatus of heat-resisting glass such as that sold under the registered trade-mark "Pyrex." Alternatively the apparatus may be made, wholly or in part of fabricated carbon, heat-resisting ceramic materials, or fused silica, and such materials are particularly valuable for constructing the reaction chamber. Despite the exceptionally high temperatures encountered in the reaction zone, which may range from red heat to brilliant incandescence, the wall of the reaction chamber can be kept below the safe limit for heat-resisting glasses, but more refractory materials provide a greater factor of safety and enable the process to be carried out more rapidly.

By way of example, in a simple glass apparatus of the form shown using a single aluminium rod and having a single downwardly directed nozzle the aluminium rod 2 may be 1⅜ inches in diameter in a 1½ inch tube 1, the nozzle 7 may be 2 mm. diameter, and the condensation chamber may be 6 inches in diameter at its widest part. The tubes 4, 5 connecting the reaction vessel with the nozzle may be 1 inch diameter.

It will be apparent to those skilled in the art that the several parts of such an apparatus may be replaced by their industrial equivalents in order to increase the scale of operation and to avoid the limitations imposed by working with glass apparatus. Also that in working on a larger scale, a plurality of aluminium rods may be used in parallel in the same reaction chamber, and that a plurality of nozzles 7 may be used to pass all the chloride produced while ensuring that the vapour is discharged in suitable streams or jets into the condensation chamber.

The aluminium chloride prepared according to this invention is dead white and of a purity equal to or greater than that of the aluminium employed. It is a powder of relatively small particle size so that it is readily capable of flowing when subjected to slight movement or vibration. The product of the invention is highly suitable for use in reactions of the Friedel-Crafts type on account of its high purity and fine state of division which permit such reactions to be carried out under closely controlled conditions and thus lead to substantially constant yields of products.

We claim:

1. A process for the production of anhydrous aluminium chloride as a free-flowing powder which includes the steps of reacting chlorine with one end of a solid rod of aluminium, cooling the massive aluminium rod at its other end to conduct heat away from the reaction zone whereby melting of any appreciable quantity of aluminium is avoided while the chloride is produced in vaporous form, conveying the vaporous substance away from the zone of reaction while maintaining its vaporous condition, and cooling the sublimed substance sufficiently to condense it directly to solid form out of contact with any solid walls, all steps being performed in the absence of moisture.

2. A process as set forth in claim 1 in which before condensing, the vaporous product is carried over heated aluminium of extended surface to remove any free chlorine entrained with it.

3. A process as set forth in claim 2 wherein the high velocity stream is downwardly discharged into the cooled space.

4. A process for the production of anhydrous aluminium chloride as a free-flowing powder comprising the steps of reacting chlorine with one end of a solid aluminium rod and cooling the other end of the rod which thus serves to dissipate the heat of reaction during the formation of vaporous aluminium chloride and prevents any substantial melting of the said rod, conveying the vaporous aluminium chloride away from the reaction zone through a zone heated so as to maintain the vaporous condition to an extended condensing zone into which condensing zone the aluminium chloride vapour is discharged with high velocity so as to condense the said vapour to solid aluminium chloride powder out of contact with any walls of the condensing zone and collecting the said solid powder in a receiver, all the said steps being performed in the absence of moisture.

References Cited in the file of this patent

UNITED STATES PATENTS

| | | |
|---|---|---|
| 1,647,446 | Wolcott | Nov. 1, 1927 |
| 1,901,486 | Wurster et al. | Mar. 14, 1933 |
| 2,020,431 | Osborne et al. | Nov. 12, 1935 |
| 2,033,055 | Valik | Mar. 3, 1936 |
| 2,385,503 | Grimble | Sept. 25, 1945 |
| 2,428,883 | Lee | Oct. 14, 1947 |

FOREIGN PATENTS

| | | |
|---|---|---|
| 342,208 | Great Britain | Jan. 29, 1931 |

OTHER REFERENCES

Ralston, "Anhydrous Aluminum Chloride," Technical Paper 321, Department of the Interior, Bureau of Mines, 1923, pages 6, 7, 8, 32, 36, 37.